US012011734B2

(12) United States Patent
Justice et al.

(10) Patent No.: US 12,011,734 B2
(45) Date of Patent: Jun. 18, 2024

(54) FUEL NOZZLE AIR SWIRLER

(71) Applicant: RAYTHEON TECHNOLOGIES CORPORATION, Farmington, CT (US)

(72) Inventors: Andrew W. Justice, Tolland, CT (US); Nicholas A. Bunce, Glastonbury, CT (US); Baris A. Sen, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 446 days.

(21) Appl. No.: 17/021,199

(22) Filed: Sep. 15, 2020

(65) Prior Publication Data

US 2022/0082258 A1 Mar. 17, 2022

(51) Int. Cl.
*B05B 7/10* (2006.01)
*F23D 11/38* (2006.01)

(52) U.S. Cl.
CPC .............. *B05B 7/10* (2013.01); *F23D 11/383* (2013.01); *F23D 2900/14241* (2013.01)

(58) Field of Classification Search
CPC ........... B05B 7/10; B05B 1/3421; B05B 1/00; F23D 11/383; F23D 2900/14241; F02M 61/162
See application file for complete search history.

(56) References Cited

U.S. PATENT DOCUMENTS

| | | | | |
|---|---|---|---|---|
| 5,351,489 | A | 10/1994 | Okamoto et al. | |
| 8,640,463 | B2 | 2/2014 | Cheung | |
| 9,951,955 | B2 * | 4/2018 | Sandelis | F23R 3/283 |
| 10,174,946 | B2 | 1/2019 | Cunha et al. | |
| 10,253,976 | B2 | 4/2019 | Gunderson | |
| 10,488,049 | B2 | 11/2019 | Lunel et al. | |
| 2008/0000234 | A1 * | 1/2008 | Commaret | F23D 11/107 60/748 |
| 2011/0271682 | A1 * | 11/2011 | Sandelis | F23C 7/004 60/737 |
| 2017/0138598 | A1 | 5/2017 | Akiyama et al. | |
| 2019/0120489 | A1 | 4/2019 | Ung et al. | |
| 2019/0128527 | A1 | 5/2019 | Cho et al. | |

OTHER PUBLICATIONS

European Patent Office; Extended European Search Report dated Feb. 3, 2022 in Application No. 21196928.2.
European Patent Office, European Office Action dated Apr. 20, 2023 in Application No. 21196928.2.

* cited by examiner

*Primary Examiner* — Christopher R Dandridge
(74) *Attorney, Agent, or Firm* — SNELL & WILMER L.L.P.

(57) ABSTRACT

A guide plate for a swirler assembly is disclosed. In various embodiments, the guide plate includes a guide plate flange configured for engagement with a swirler body having a plurality of primary swirler inlets; and a first plurality of purge holes extending through the guide plate flange and configured to introduce a first vectored purge flow into the swirler body.

20 Claims, 7 Drawing Sheets

FUEL NOZZLE AIR SWIRLER

FIELD

The present disclosure relates generally to gas turbine engines and, more particularly, to fuel swirlers used in combustor sections of gas turbine engines.

BACKGROUND

Gas turbine engines typically include a fan section, a compressor section, a combustor section and a turbine section. The fan section drives air along a bypass flow path while the compressor section drives air along a core flow path. In general, during operation, air is pressurized in the compressor section and is mixed with fuel and burned in the combustor section to generate hot combustion gases. Efficient and thorough mixing and combustion of the fuel and air is often facilitated using swirlers disposed upstream of a combustion zone where burning of the fuel and air occurs. Following combustion, the hot combustion gases flow through the turbine section, which extracts energy from the hot combustion gases to power the compressor section and other gas turbine engine loads, such as those required to rotate fan blades in the fan section. The compressor section typically includes a low pressure compressor and a high pressure compressor, and the turbine section typically includes a low pressure turbine and a high pressure turbine connected, respectively, to the low pressure compressor and to the high pressure compressor.

SUMMARY

A guide plate for a swirler assembly is disclosed. In various embodiments, the guide plate includes a guide plate flange configured for engagement with a swirler body having a plurality of primary swirler inlets; and a first plurality of purge holes extending through the guide plate flange and configured to introduce a first vectored purge flow into the swirler body.

In various embodiments, each of the first plurality of purge holes is defined by a first axial angle with respect to a longitudinal axis extending through the swirler body. In various embodiments, the first axial angle is from about zero degrees to about sixty degrees. In various embodiments, each of the first plurality of purge holes is defined by a first radial angle with respect to a radial axis extending through the swirler body. In various embodiments, the first radial angle is from about zero degrees to about sixty degrees. In various embodiments, a second plurality of purge holes extends through the guide plate flange and is configured to introduce a second vectored purge flow into the swirler body.

In various embodiments, each of the first plurality of purge holes has a first entrance opening positioned at a first radial entrance position and each of the second plurality of purge holes has a second entrance opening positioned at a second radial entrance position, the second radial entrance position being different from the first radial entrance position.

In various embodiments, each of the first plurality of purge holes has a first exit opening positioned at a first radial exit position and each of the second plurality of purge holes has a second exit opening positioned at a second radial exit position, the second radial exit position being equal to the first radial exit position.

In various embodiments, each of the first plurality of purge holes has a first exit opening positioned at a first radial exit position and each of the second plurality of purge holes has a second exit opening positioned at a second radial exit position, the second radial exit position being different from the first radial exit position.

In various embodiments, each of the first plurality of purge holes is defined by a first axial angle with respect to a longitudinal axis extending through the swirler body and each of the second plurality of purge holes is defined by a second axial angle with respect to the longitudinal axis, the second axial angle being different from the first axial angle.

In various embodiments, each of the first plurality of purge holes is defined by a first radial angle with respect to a radial axis extending through the swirler body and each of the second plurality of purge holes is defined by a second radial angle with respect to the radial axis, the second radial angle being different from the first radial angle.

A swirler assembly is disclosed. In various embodiments, the swirler assembly includes a swirler body defining an axial direction and having a plurality of primary swirler inlets extending through the swirler body to a radially inner swirler surface of the swirler body; and a guide plate configured for engagement with the swirler body, the guide plate including a first plurality of purge holes extending through a guide plate flange and configured to introduce a first vectored purge flow into the swirler body.

In various embodiments, each of the first plurality of purge holes is defined by a first axial angle with respect to a longitudinal axis extending through the swirler body, the first axial angle being from about zero degrees to about sixty degrees. In various embodiments, each of the first plurality of purge holes is defined by a first radial angle with respect to a radial axis extending through the swirler body, the first radial angle being from about zero degrees to about sixty degrees. In various embodiments, a second plurality of purge holes extends through the guide plate flange and is configured to introduce a second vectored purge flow into the swirler body.

In various embodiments, each of the first plurality of purge holes has a first entrance opening positioned at a first radial entrance position and each of the second plurality of purge holes has a second entrance opening positioned at a second radial entrance position, the second radial entrance position being equal to the first radial entrance position.

In various embodiments, each of the first plurality of purge holes has a first exit opening positioned at a first radial exit position and each of the second plurality of purge holes has a second exit opening positioned at a second radial exit position, the second radial exit position being different from the first radial exit position.

In various embodiments, each of the first plurality of purge holes has a first exit opening positioned at a first radial exit position and each of the second plurality of purge holes has a second exit opening positioned at a second radial exit position, the second radial exit position being different from the first radial exit position.

In various embodiments, each of the first plurality of purge holes is defined by a first axial angle with respect to a longitudinal axis extending through the swirler body and each of the second plurality of purge holes is defined by a second axial angle with respect to the longitudinal axis, the second axial angle being different from the first axial angle.

In various embodiments, each of the first plurality of purge holes is defined by a first radial angle with respect to a radial axis extending through the swirler body and each of the second plurality of purge holes is defined by a second radial angle with respect to the radial axis, the second radial angle being different from the first radial angle.

The foregoing features and elements may be combined in various combinations, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to “a,” “an” or “the” may include one or more than one and that reference to an item in the singular may also include the item in the plural. Further, all ranges may include upper and lower values and all ranges and ratio limits disclosed herein may be combined.

Figure 1A:
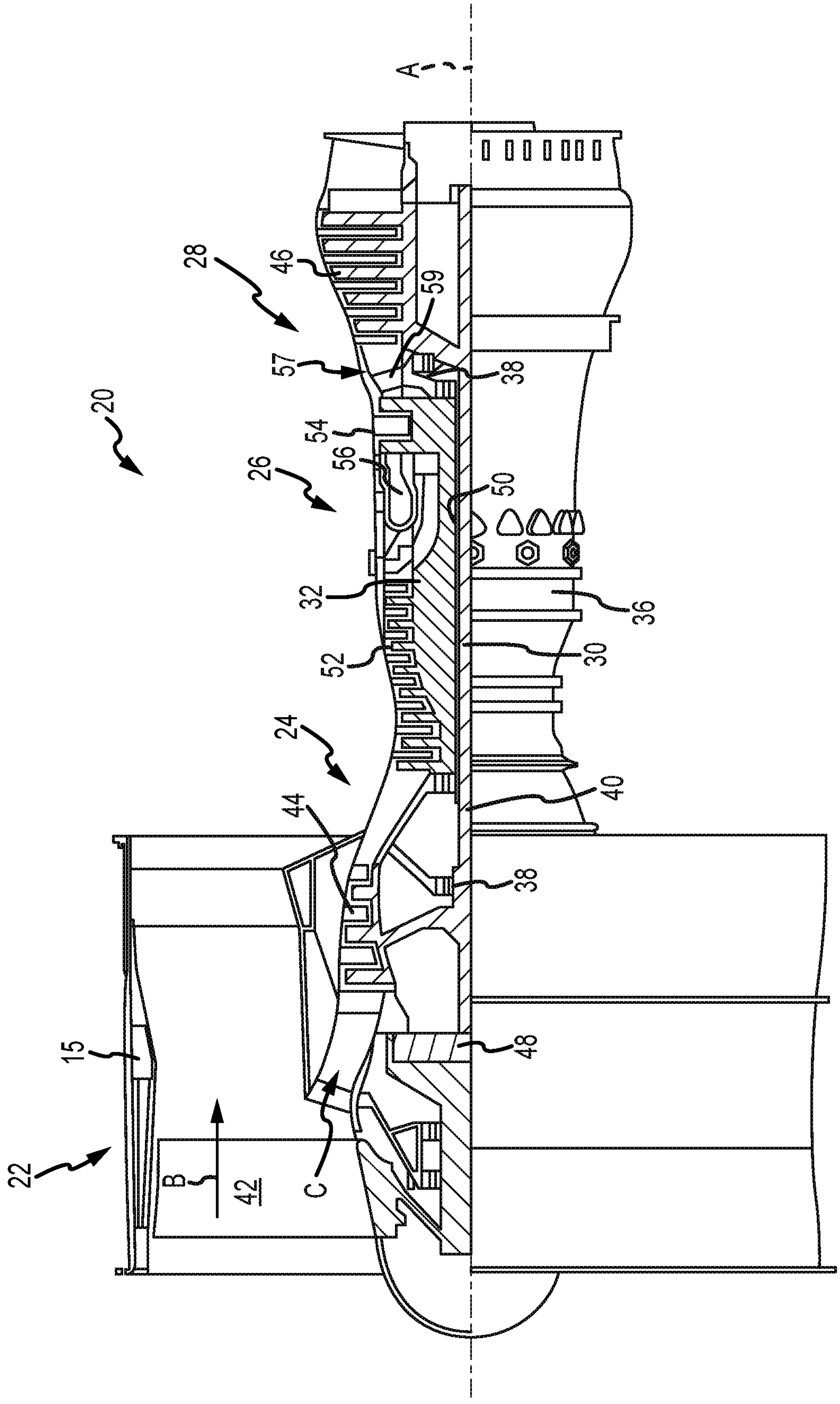
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than that of the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
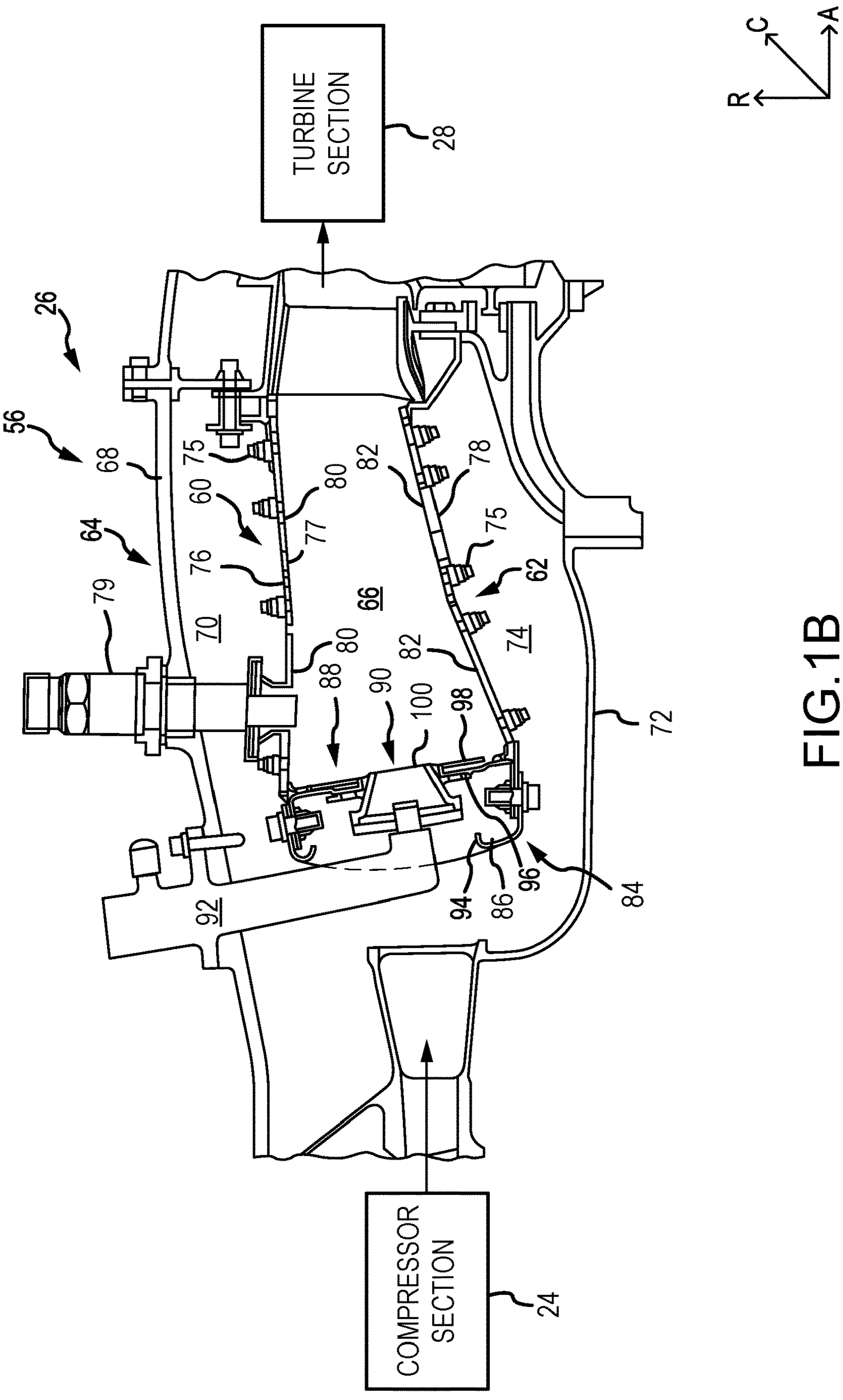
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirler assemblies 90 (one shown). Each of the plurality of swirler assemblies 90 is aligned with a respective one of a plurality of fuel nozzles 92 (one shown) and a respective one of a plurality of hood ports 94 (one shown) to project through the bulkhead liner assembly 88; generally, the plurality of swirler assemblies 90, the plurality of fuel nozzles 92 and the plurality of hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the plurality of bulkhead panels 98 is circumferentially distributed about the bulkhead liner assembly 88. The bulkhead support shell 96 is generally annular and the plurality of bulkhead panels 98 is segmented, typically one panel to each of the plurality of fuel nozzles 92 and the plurality of swirler assemblies 90. The annular hood 86 extends radially between, and is secured to, the forward-most ends of the outer liner assembly 60 and the inner liner assembly 62. Each of the plurality of hood ports 94 receives a respective one of the plurality of fuel nozzles 92 and facilitates the direction of compressed air into the forward end of the combustion chamber 66 through a respective one of a plurality of swirler openings 100. Each of the plurality of fuel nozzles 92 may be secured to the diffuser case module 64 and project through a respective one of the plurality of hood ports 94 and into a respective one of the plurality of swirler assemblies 90.

The forward assembly 84 introduces compressed air from the core flow path C into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. An igniter 79 is located downstream of the plurality of fuel nozzles 92 used to ignite the blended fuel-air mixture. Air in the outer annular plenum 70 and the inner annular plenum 74 is also introduced into the combustion chamber 66 via a plurality of orifices 77, which may include dilution holes or air feed holes of various dimension. The outer support shell 76 may also include a plurality of impingement holes that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 2B:
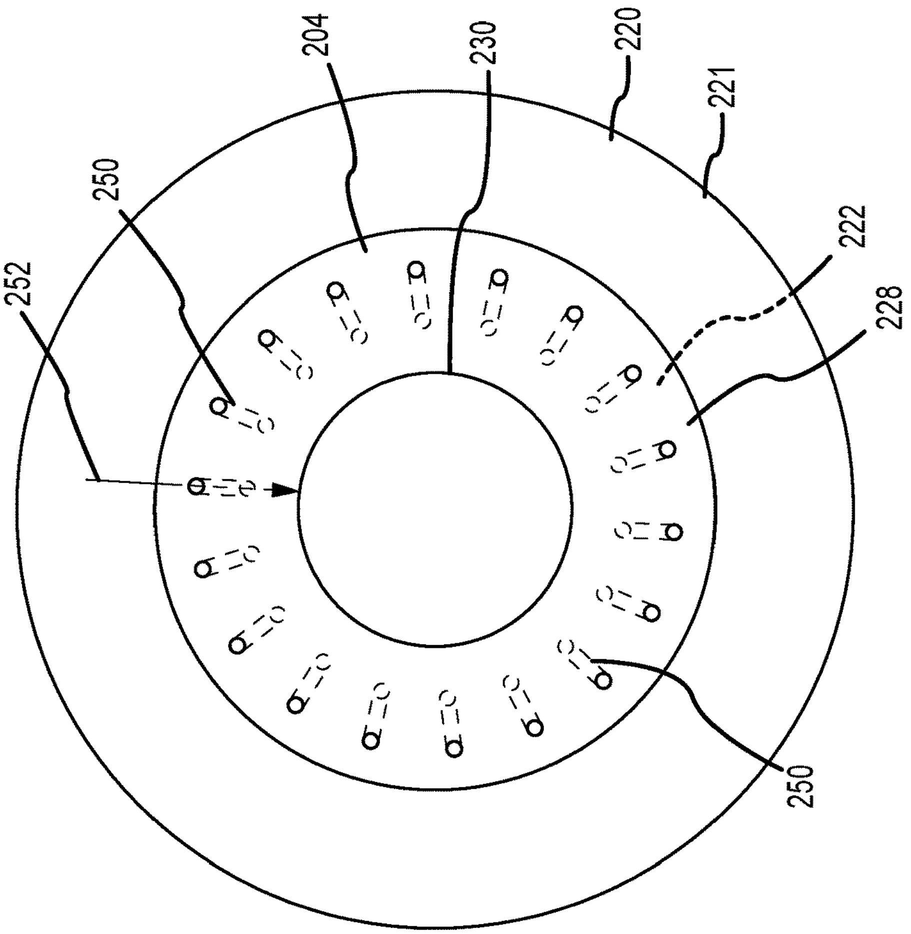
FIG. 2B is a frontal view of a guide plate, in accordance with various embodiments.
Figure 2A:
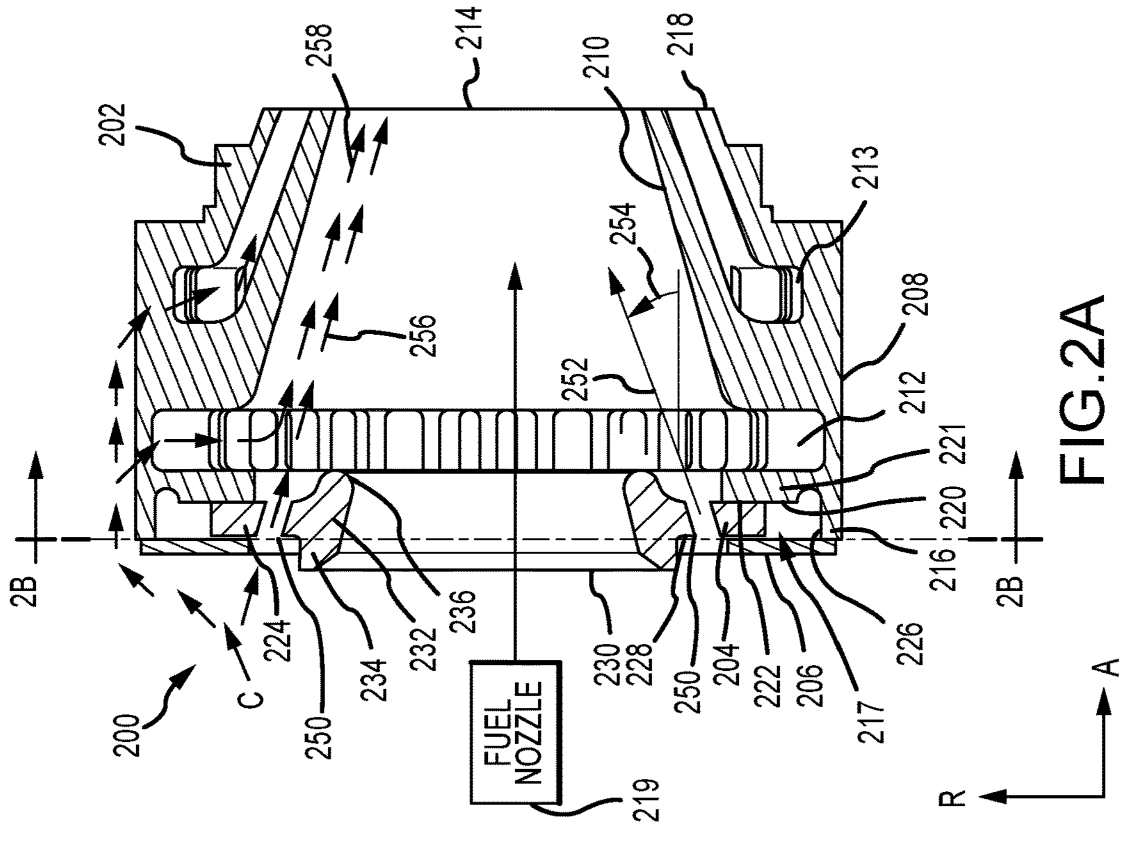
FIG. 2A is a cross sectional view of a swirler assembly, in accordance with various embodiments.

Referring now to FIGS. 2A and 2B, a swirler assembly 200, such as, for example, one of the plurality of swirler assemblies 90 described above with reference to FIG. 1B, is illustrated with reference to an axial direction A (or a longitudinal axis) and a radial direction R (or a radial axis). The swirler assembly 200 may comprise a swirler body 202, a guide plate 204 and a retaining ring 206. In various embodiments, the swirler body 202 is configured to swirl airflow and provide the swirled airflow into a combustion chamber, such as, for example, the combustion chamber 66 described above with reference to FIG. 1B. The swirler body 202 may comprise a radially outer swirler surface 208 and a radially inner swirler surface 210. The swirler body 202 typically includes a plurality of primary swirler inlets 212 spaced circumferentially about the radially outer swirler surface 208. Each of the plurality of primary swirler inlets 212 defines a radial void extending through the radially outer swirler surface 208 that is configured to receive a flow of compressed air from a core flow path C (e.g., from the compressor section 24 described above with reference to FIGS. 1A and 1B), impart a swirl to the flow, and then introduce the swirling flow through the swirler body 202, via a swirler opening 214 extending along an axial length of the swirler body 202, and into the combustion chamber. The swirler body 202 may comprise a forward swirler body portion 216 located axially opposite an aft swirler body portion 218, between which the swirler opening 214 extends. In various embodiments, the swirler body 202 may further comprise a plurality of secondary swirler inlets 213 disposed downstream of the plurality of primary swirler inlets 212 and configured to introduce a secondary swirling flow downstream of the aft swirler body portion 218.

In various embodiments, the forward swirler body portion 216 is configured to interface with the guide plate 204. For example, the swirler body 202 may comprise a forward swirler body face 220 that is positioned axially inward of the forward swirler body portion 216. The axially inward position provides for a swirler body recession 217 that extends circumferentially around the forward swirler body face 220 and is configured to at least partially receive an aft surface 222 of a guide plate flange 224. In this manner, the forward swirler body face 220 may comprise any suitable size capable of at least partially receiving the guide plate flange 224 within the swirler body recession 217. For example, the forward swirler body face 220 may comprise an inner diameter (in the radial direction) greater than an outer diameter of guide plate flange 224, such that the guide plate 204 may fit within the swirler body recession 217. The forward swirler body portion 216 may also define an annular wall portion 226 that circumferentially surrounds the forward swirler body face 220 and is sized to receive the guide plate flange 224. In various embodiments, the forward swirler body face 220 is considered part of a retainer body 221 that is configured to receive and retain, in conjunction with the retaining ring 206, the guide plate flange 224 within the swirler body recession 217.

In various embodiments, the guide plate 204 may be configured to at least partially provide sealing between the higher pressure upstream air located radially outward from the swirler body 202 and the lower pressure downstream air located within swirler body 202. In this regard, the guide plate 204 may provide sealing to ensure the compressed air from the compressor section is forced into the plurality of primary swirler inlets 212 extending in to the swirler body 202. In various embodiments, the guide plate 204 may comprise a forward surface 228 axially opposite the aft surface 222 of the guide plate flange 224. The aft surface 222 may be configured to couple to or interface with the forward swirler body face 220 of the retainer body 221, allowing the guide plate 204 to at least partially fit within swirler body 202 (or at least partially fit within the swirler body recession 217). The guide plate 204 may also comprise a guide plate opening 230 configured to receive a nozzle end of a fuel nozzle 219, such as, for example, one of the plurality of fuel nozzles 92 described above with reference to FIG. 1B. In various embodiments, the guide plate opening 230 defines an axial void that substantially aligns with the swirler opening 214 when the guide plate 204 is assembled with the swirler body 202 and the fuel nozzle 219.

In various embodiments, the guide plate 204 may comprise a guide plate collar 232 having a forward protrusion 234 and an aft protrusion 236. In various embodiments, the forward protrusion 234 is located on the forward surface 228 and extends in an axial direction away from the forward surface 228 of the guide plate 204. In various embodiments, the forward protrusion 234 may define a forward circumferential boundary for the guide plate opening 230. Similarly, the aft protrusion 236 is located on the aft surface 222 and extends in an axial direction away from the aft surface 222 of the guide plate 204. The aft protrusion 236 may define an aft circumferential boundary for the guide plate opening 230. In various embodiments, the forward circumferential boundary and the aft circumferential boundary are configured to receive the fuel nozzle 219 when assembled into the combustor. In various embodiments, the retaining ring 206 is configured to retain the guide plate flange 224 within the swirler body recession 217.

Referring more particularly to FIG. 2B, with continued reference to FIG. 2A, further details of the guide plate 204 are discussed. As illustrated, compressed air from the core flow path C is introduced into the interior of the swirler body 202 via the plurality of primary swirler inlets 212. Compressed air from the core flow path C is also introduced into the swirler body via a plurality of purge holes 250 that extend from the forward surface 228 of the guide plate 204 to the aft surface 222 of the guide plate 204. As illustrated, each of the plurality of purge holes 250 is oriented at a vector direction 252 that, in various embodiments, is defined by an angle 254 (or an axial angle) with respect to the axial direction A. The orientation of the vector direction 252 produces a vectored purge flow 256 that exits each of the plurality of purge holes 250 at the aft surface 222 of the guide plate 204 and mixes with a primary swirler flow 258 exiting the plurality of primary swirler inlets 212. In various embodiments, the angle 254 ranges from between about zero degrees (0°) to about sixty degrees (60°); or, in various embodiments, the angle 254 ranges from between about fifteen degrees (15°) to about forty-five degrees (45°); or, in various embodiments, the angle 254 is about thirty degrees (30°).

Figure 3A:
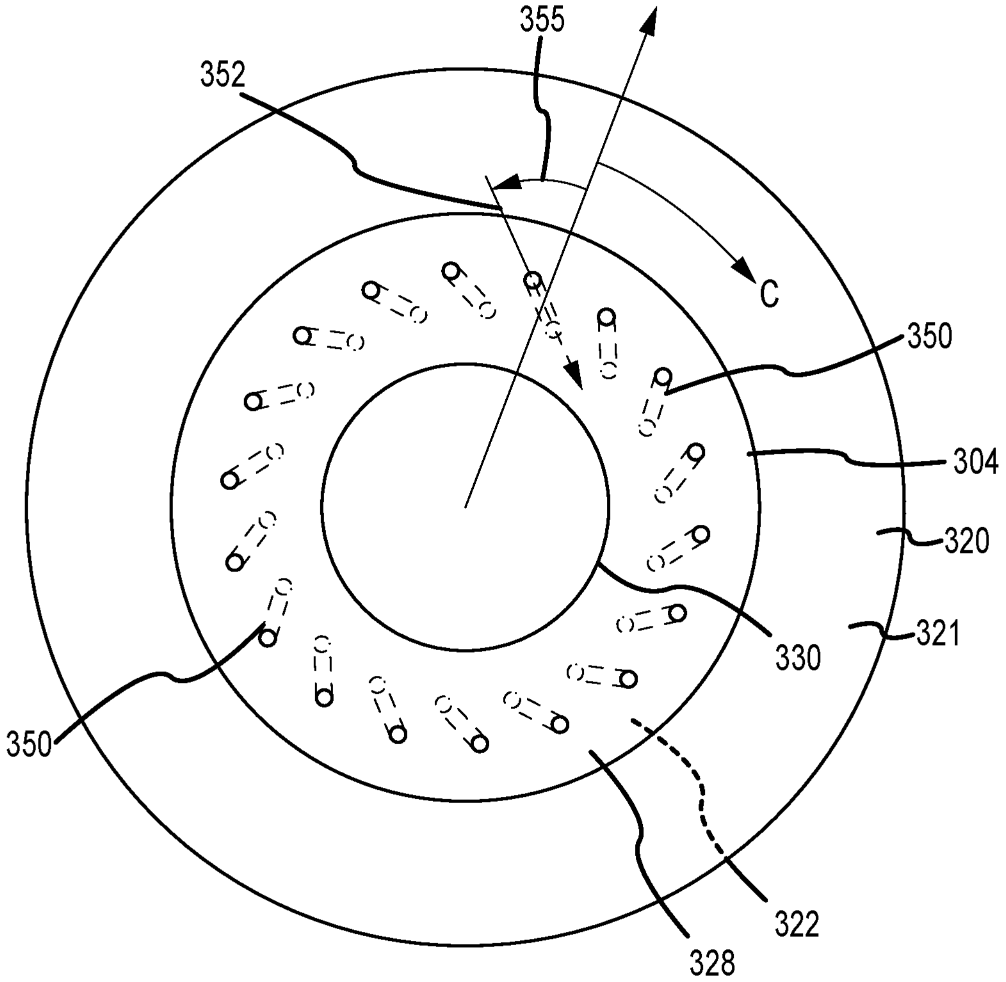
FIGS. 3A and 3B are frontal views of guide plates, in accordance with various embodiments.
Figure 3B:
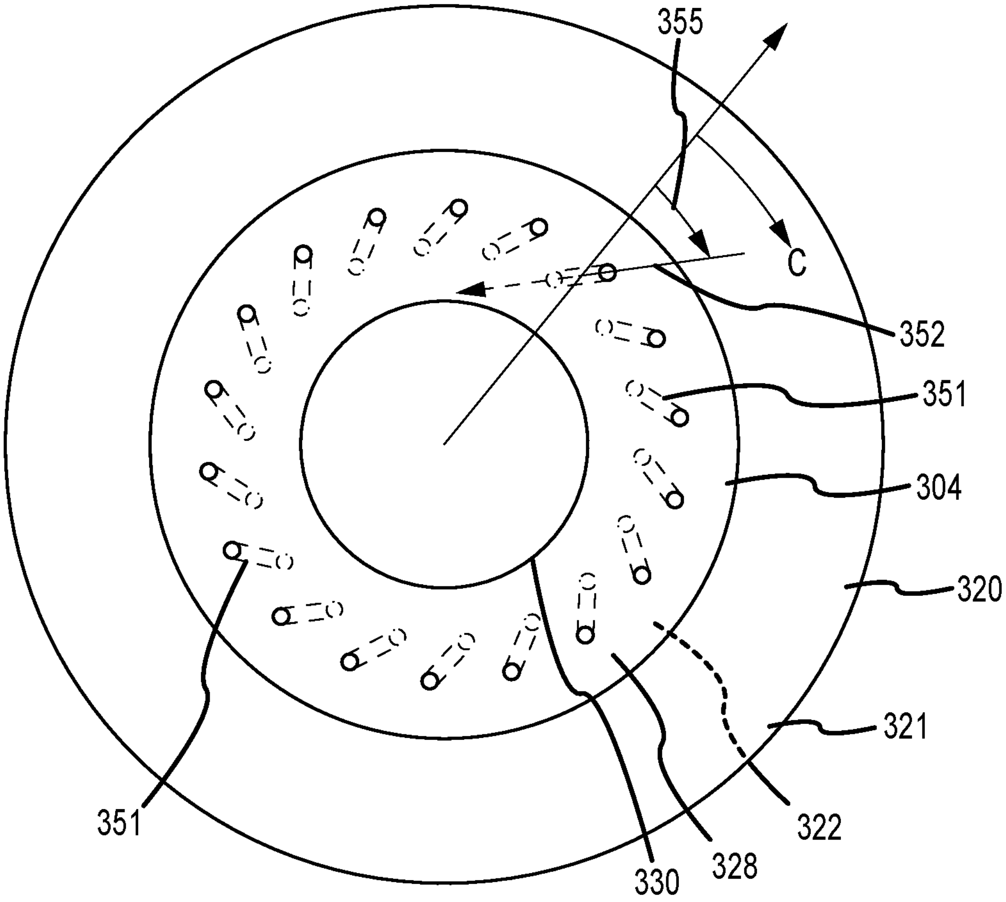

Referring now to FIGS. 3A and 3B, a frontal view of a guide plate 304 disposed adjacent a forward swirler body face 320 of a retainer body 321 and having a guide plate opening 330, similar to the forward swirler body face 220 of the retainer body 221 and the guide plate opening 230 described above with reference to FIGS. 2A and 2B, is illustrated. In a manner similar to the swirler assembly 200 described above, compressed air from a core flow path C is introduced into a swirler body via one or more pluralities of swirler inlets (e.g., the plurality of primary swirler inlets 212 and the plurality of secondary swirler inlets 213). Compressed air from the core flow path C is also introduced into the swirler body via a plurality of purge holes 350 that extend from a forward surface 328 of the guide plate 304 to an aft surface 322 of the guide plate 304. As illustrated, each of the plurality of purge holes 350 is oriented at a vector direction 352 that, in various embodiments, is defined by an angle 355 (or a radial angle) with respect to a radial direction R as well as an angle with respect to an axial direction (e.g., the angle 254 with respect to the axial direction A as illustrated in FIGS. 2A and 2B). The orientation of the vector direction 352 produces a vectored purge flow (e.g., the vectored purge flow 256) that exits each of the plurality of purge holes 350 at the aft surface 322 of the guide plate 304 and mixes with a primary swirler flow exiting a plurality of primary swirler inlets (e.g., the primary swirler flow 258 exiting the plurality of primary swirler inlets 212).

A difference between the embodiments illustrated in FIGS. 2A and 2B and FIGS. 3A and 3B is the latter embodiments introduce a swirl component to the vector directions of the plurality of purge holes 350. More specifically, the vector direction 352 includes a component in the axial direction plus a component in the circumferential direction C. In various embodiments, the component in the circumferential direction C may be in the same direction as a primary swirling flow exiting the plurality of primary swirler inlets, or, in various embodiments, the component in the circumferential direction C may be in the opposite direction as the primary swirling flow exiting the plurality of primary swirler inlets. The two situations are illustrated in FIGS. 3A and 3B. As illustrated in FIG. 3A, for example, the component in the circumferential direction C (e.g., the angle 355) of the vectored purge flow exiting the plurality of purge holes 350 is in the positive circumferential direction C, whereas in FIG. 3B, the component in the circumferential direction C of the vectored purge flow exiting a plurality of purge holes 351 is in the negative circumferential direction C. In various embodiments, the angle 355 ranges from between about zero degrees (0°) to about sixty degrees (60°); or, in various embodiments, the angle 355 ranges from between about fifteen degrees (15°) to about forty-five degrees (45°); or, in various embodiments, the angle 355 is about thirty degrees (30°). Note that in FIG. 3B, the above stated angles will be in the negative direction, and in both FIGS. 3A and 3B, the zero degree (0°) case defaults to the embodiments illustrated in FIGS. 2A and 2B.

Figure 4:
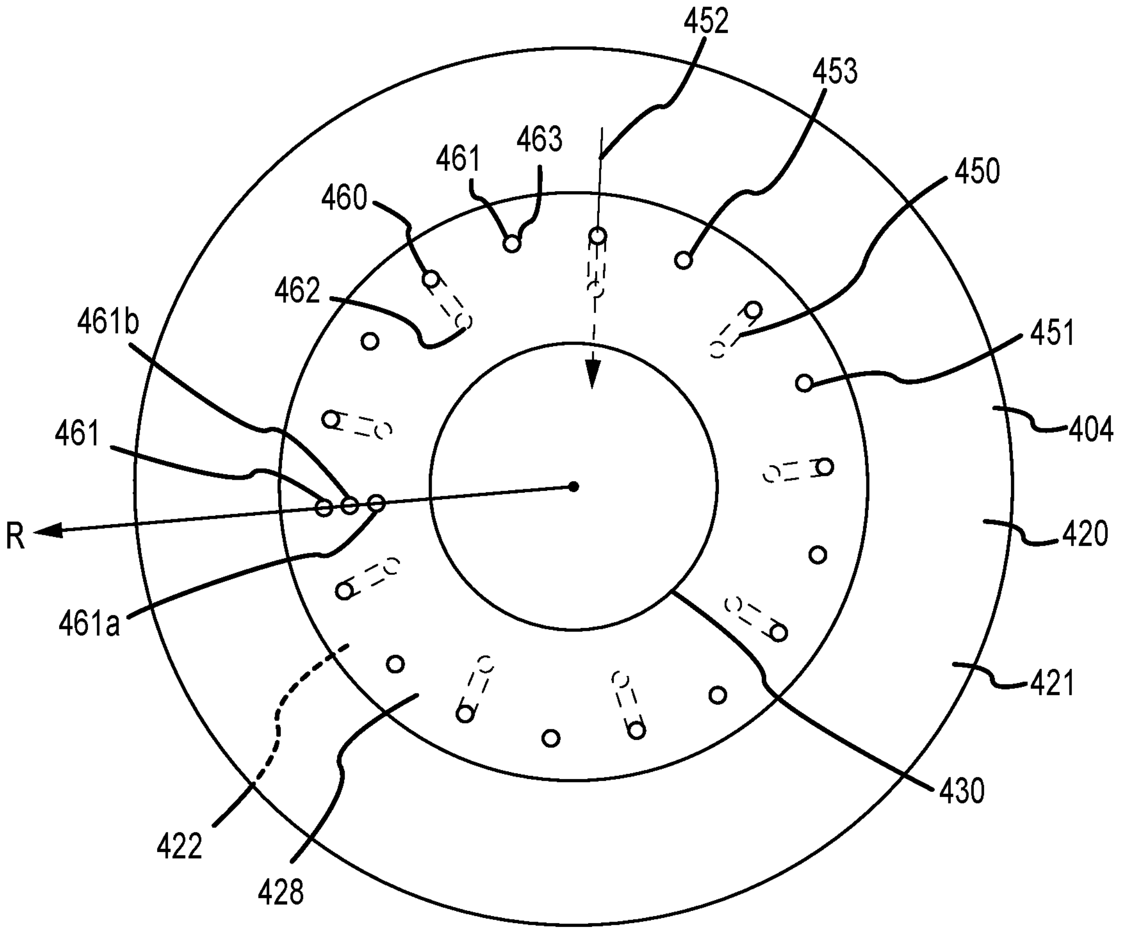
FIG. 4 is a frontal view of a guide plate, in accordance with various embodiments.

Referring now to FIG. 4, a frontal view of a guide plate 404 disposed adjacent a forward swirler body face 420 of a retainer body 421 and having a guide plate opening 430, similar to the forward swirler body face 220 of the retainer body 221 and the guide plate opening 230 described above with reference to FIGS. 2A and 2B, is illustrated. In a manner similar to the swirler assembly 200 described above, compressed air from a core flow path C is introduced into a swirler body via one or more pluralities of swirler inlets (e.g., the plurality of primary swirler inlets 212 and the plurality of secondary swirler inlets 213). Compressed air from the core flow path C is also introduced into the swirler body via a first plurality of purge holes 450, producing a first vectored purge flow, and a second plurality of purge holes 451, producing a second vectored purge flow, that extend from a forward surface 428 of the guide plate 404 to an aft surface 422 of the guide plate 404.

As illustrated, each of the first plurality of purge holes 450 and the second plurality of purge holes 451 is oriented at a vector direction 452 that, in various embodiments, is similar to the vector direction 252 described above with reference to FIGS. 2A and 2B, or the vector direction 352 described above with reference to FIGS. 3A and 3B. In other words, the vector directions of the first plurality of purge holes 450 and the second plurality of purge holes 451 may be defined by a first axial angle and a first radial angle and a second axial angle and a second radial angle, respectively. As illustrated, each of the second plurality of purge holes 451 is oriented in the axial direction, though other directions are contemplated, generally within the ranges described above with reference to FIGS. 2A and 2B and FIGS. 3A and 3B. In various embodiments, the radial position of each of a plurality of entrance openings 460 (or a first radial entrance position of a first entrance opening) of the first plurality of purge holes 450 is equal to the radial position of each of a plurality of entrance openings 461 (or a second radial entrance position of a second entrance opening) of each of the second plurality of purge holes 451, while in various embodiments, the radial position of each of a plurality of exit openings 462 (or a first radial exit position of a first exit opening) of the first plurality of purge holes 450 is positioned radially inward of the radial position of each of a plurality of exit openings 463 (or a second radial exit position of a second exit opening) of each of the second plurality of purge holes 451.

Note that while FIG. 4 illustrates the radial position of each of the plurality of entrance openings 460 of the first plurality of purge holes 450 is equal to the radial position of each of the plurality of entrance openings 461 of each of the second plurality of purge holes 451, the disclosure contemplates other orientations, both for the entrance openings and the exit openings. For example, in various embodiments, the radial position of each of a plurality of entrance openings 461*a* of each of the second plurality of purge holes 451 may be positioned at a radial location equal to the radial position of each of the plurality of exit openings 462 of the first plurality of purge holes 450. Or, in various embodiments, the radial position of each of a plurality of entrance openings 461*b* of each of the second plurality of purge holes 451 may be positioned at a radial location intermediate the radial position of each of the plurality of exit openings 462 of the first plurality of purge holes 450 and the radial position of each of the plurality of entrance openings 460 of the first plurality of purge holes 450. Other such radial positionings of the entrance openings and the exit openings are contemplated by the disclosure.

Figure 5:
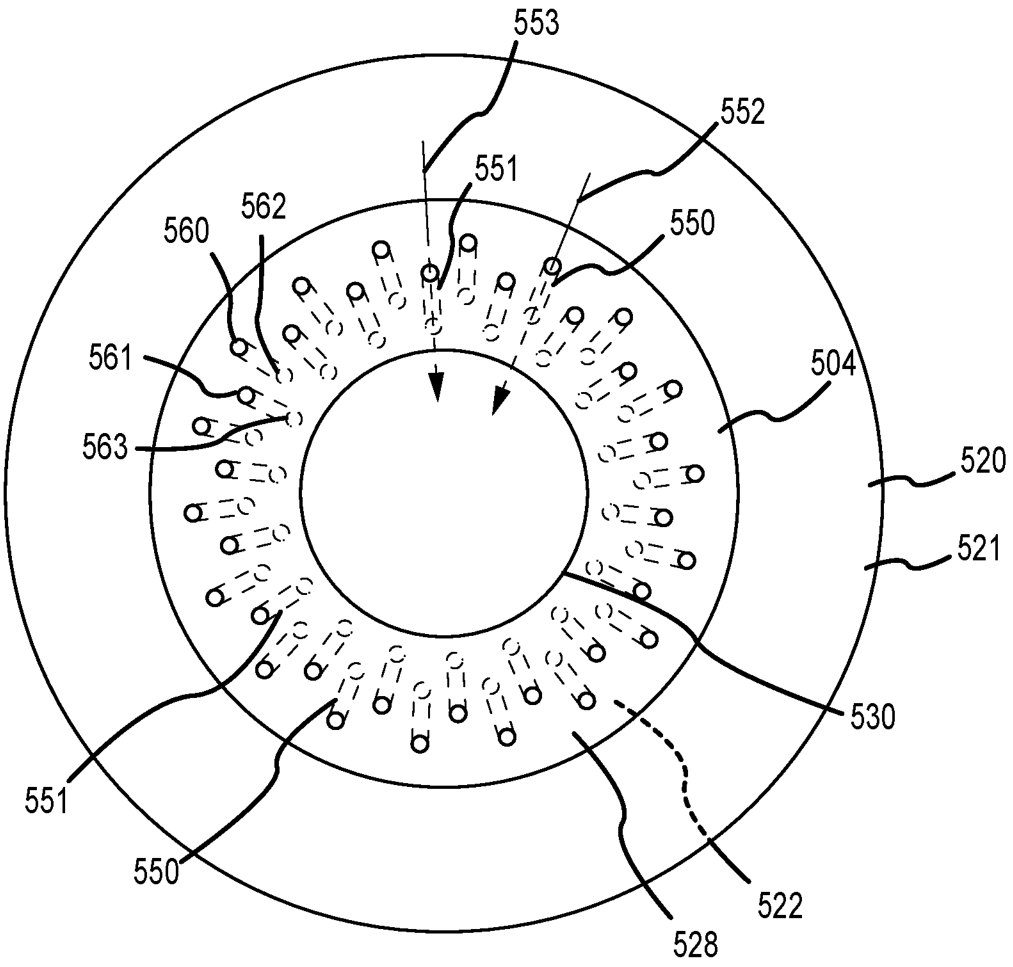
FIG. 5 is a frontal view of a guide plate, in accordance with various embodiments.

Referring now to FIG. 5, a frontal view of a guide plate 504 disposed adjacent a forward swirler body face 520 of a retainer body 521 and having a guide plate opening 530, similar to the forward swirler body face 220 of the retainer body 221 and the guide plate opening 230 described above with reference to FIGS. 2A and 2B, is illustrated. In a manner similar to the swirler assembly 200 described above, compressed air from a core flow path C is introduced into a swirler body via one or more pluralities of swirler inlets (e.g., the plurality of primary swirler inlets 212 and the plurality of secondary swirler inlets 213). Compressed air from the core flow path C is also introduced into the swirler body via a first plurality of purge holes 550, producing a first vectored purge flow, and a second plurality of purge holes 551, producing a second vectored purge flow, that extend from a forward surface 528 of the guide plate 504 to an aft surface 522 of the guide plate 504.

As illustrated, each of the first plurality of purge holes 550 is oriented at a first vector direction 552 and the second plurality of purge holes 551 is oriented at a second vector direction 553 that, in various embodiments, are similar to the vector direction 252 described above with reference to FIGS. 2A and 2B, or the vector direction 352 described above with reference to FIGS. 3A and 3B. In other words, the vector directions of the first plurality of purge holes 550 and the second plurality of purge holes 551 may be defined by a first axial angle and a first radial angle and a second axial angle and a second radial angle, respectively. In various embodiments, the radial position of each of a plurality of entrance openings 560 (or a first radial entrance position of a first entrance opening) of the first plurality of purge holes 550 is radially outward of the radial position of each of a plurality of entrance openings 561 (or a second radial entrance position of a second entrance opening) of each of the second plurality of purge holes 551, while in various embodiments, the radial position of each of a plurality of exit openings 562 (or a first radial exit position of a first exit opening) of the first plurality of purge holes 550 is positioned at a radial position radially outward of each of a plurality of exit openings 563 (or a second radial exit position of a second exit opening) of each of the second plurality of purge holes 551.

The concepts and applications described improve flow instabilities within and downstream of a swirler body by adding an auxiliary flow of air through a guide plate. The auxiliary flow of air reduces the flow instabilities that are known drivers of tones or pressure oscillations in the combustor. The auxiliary flow of air also reduces the otherwise large regions of low pressure recirculation at the center of the swirler along the fuel nozzle tip. The guide plates described above direct air around the fuel nozzle to force the recirculation away from the fuel nozzle tip, which reduces perturbations in the reacting flow downstream of the swirler. The guide plate design may be implemented and tailored to a variety of different 2-Pass and 3-Pass swirler configurations to reduce tones or pressure oscillations in a combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean “one and only one” unless explicitly so stated, but rather “one or more.” Moreover, where a phrase similar to “at least one of A, B, or C” is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to “one embodiment,” “an embodiment,” “various embodiments,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms “substantially,” “about” or “approximately” as used herein represent an amount close to the stated amount that still performs a desired function or achieves a desired result. For example, the term “substantially,” “about” or “approximately” may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A guide plate for a swirler assembly, comprising:

a forward surface;

an aft surface;

a guide plate flange configured for engagement with a swirler body having a plurality of primary swirler inlets, wherein the swirler body at least partially defines a forward swirler body portion located axially opposite an aft swirler body portion, between which a swirler opening extends, the forward swirler body portion defining an annular wall portion, a radially inner swirler surface extending from the plurality of primary swirler inlets to the aft swirler body portion and at least partially defining the swirler opening, a retainer body comprising a forward swirler body face wherein the annular wall portion circumferentially surrounds the forward swirler body face, and a swirler body recession that extends circumferentially around the forward swirler body face at least partially receiving an aft surface of the guide plate flange, wherein the plurality of primary swirler inlets are disposed axially aft of the retainer body and the forward swirler body portion, and wherein the guide plate is configured to interface with the forward swirler body portion, the guide plate contacting the forward swirler body face when engaged with the swirler body;

a guide plate collar including a forward protrusion located on the forward surface and extending axially away from the forward surface and an aft protrusion located on the aft surface and extending axially away from the aft surface, the guide plate collar configured for engagement with a fuel nozzle; and a first plurality of purge holes extending through the guide plate flange from the forward surface to the aft surface and configured to introduce a first vectored purge flow into the swirler body.

2. The guide plate of claim 1, wherein each of the first plurality of purge holes is defined by a first axial angle with respect to a longitudinal axis extending through the swirler body.

3. The guide plate of claim 2, wherein the first axial angle is from about zero degrees to about sixty degrees.

4. The guide plate of claim 3, wherein each of the first plurality of purge holes is defined by a first radial angle with respect to a radial axis extending through the swirler body.

5. The guide plate of claim 4, wherein the first radial angle is from about zero degrees to about sixty degrees.

6. The guide plate of claim 1, further comprising a second plurality of purge holes extending through the guide plate flange and configured to introduce a second vectored purge flow into the swirler body.

7. The guide plate of claim 6, wherein each of the first plurality of purge holes has a first entrance opening positioned at a first radial entrance position and each of the second plurality of purge holes has a second entrance opening positioned at a second radial entrance position, the second radial entrance position being different from the first radial entrance position.

8. The guide plate of claim 6, wherein each of the first plurality of purge holes has a first exit opening positioned at a first radial exit position and each of the second plurality of purge holes has a second exit opening positioned at a second radial exit position, the second radial exit position being equal to the first radial exit position.

9. The guide plate of claim 6, wherein each of the first plurality of purge holes has a first exit opening positioned at a first radial exit position and each of the second plurality of purge holes has a second exit opening positioned at a second radial exit position, the second radial exit position being different from the first radial exit position.

10. The guide plate of claim 6, wherein each of the first plurality of purge holes is defined by a first axial angle with respect to a longitudinal axis extending through the swirler body and each of the second plurality of purge holes is defined by a second axial angle with respect to the longitudinal axis, the second axial angle being different from the first axial angle.

11. The guide plate of claim 6, wherein each of the first plurality of purge holes is defined by a first radial angle with respect to a radial axis extending through the swirler body and each of the second plurality of purge holes is defined by a second radial angle with respect to the radial axis, the second radial angle being different from the first radial angle.

12. A swirler assembly, comprising:

a swirler body defining an axial direction and having a plurality of primary swirler inlets extending through the swirler body to a radially inner swirler surface of the swirler body; and a guide plate comprising a guide plate flange, a guide plate collar, a forward surface, and an aft surface, and a first plurality of purge holes, the guide plate flange configured for engagement with the swirler body, the guide plate collar including a forward protrusion located on the forward surface and extending axially away from the forward surface and an aft protrusion located on the aft surface and extending axially away from the aft surface, the guide plate collar configured for engagement with a fuel nozzle, the first plurality of purge holes extending through the guide plate flange from the forward surface to the aft surface, and configured to introduce a first vectored purge flow into the swirler body;

wherein the swirler body at least partially defines a forward swirler body portion located axially opposite an aft swirler body portion, between which a swirler opening extends, the forward swirler body portion defining an annular wall portion, the radially inner swirler surface extending from the plurality of primary swirler inlets to the aft swirler body portion and at least partially defining the swirler opening, a retainer body comprising a forward swirler body face wherein the annular wall portion circumferentially surrounds the forward swirler body face, and a swirler body recession that extends circumferentially around the forward swirler body face at least partially receiving the aft surface of the guide plate flange;

wherein the plurality of primary swirler inlets are disposed axially aft of the retainer body and the forward swirler body portion;

wherein the guide plate is configured to interface with the forward swirler body portion, the guide plate contacting the forward swirler body face when engaged with the swirler body.

13. The swirler assembly of claim 12, wherein each of the first plurality of purge holes is defined by a first axial angle with respect to a longitudinal axis extending through the swirler body, the first axial angle being from about zero degrees to about sixty degrees.

14. The swirler assembly of claim 13, wherein each of the first plurality of purge holes is defined by a first radial angle with respect to a radial axis extending through the swirler body, the first radial angle being from about zero degrees to about sixty degrees.

15. The swirler assembly of claim 12, further comprising a second plurality of purge holes extending through the guide plate flange and configured to introduce a second vectored purge flow into the swirler body.

16. The swirler assembly of claim 15, wherein each of the first plurality of purge holes has a first entrance opening positioned at a first radial entrance position and each of the second plurality of purge holes has a second entrance opening positioned at a second radial entrance position, the second radial entrance position being equal to the first radial entrance position.

17. The swirler assembly of claim 15, wherein each of the first plurality of purge holes has a first exit opening positioned at a first radial exit position and each of the second plurality of purge holes has a second exit opening positioned at a second radial exit position, the second radial exit position being different from the first radial exit position.

18. The swirler assembly of claim 15, wherein each of the first plurality of purge holes has a first exit opening positioned at a first radial exit position and each of the second plurality of purge holes has a second exit opening positioned at a second radial exit position, the second radial exit position being different from the first radial exit position.

19. The swirler assembly of claim 15, wherein each of the first plurality of purge holes is defined by a first axial angle with respect to a longitudinal axis extending through the swirler body and each of the second plurality of purge holes is defined by a second axial angle with respect to the longitudinal axis, the second axial angle being different from the first axial angle.

20. The swirler assembly of claim 15, wherein each of the first plurality of purge holes is defined by a first radial angle with respect to a radial axis extending through the swirler body and each of the second plurality of purge holes is defined by a second radial angle with respect to the radial axis, the second radial angle being different from the first radial angle.

* * * * *